United States Patent
Yi et al.

(10) Patent No.: US 10,225,869 B2
(45) Date of Patent: Mar. 5, 2019

(54) INTERNET OF THINGS DEVICE RANDOM ACCESS METHOD AND SYSTEM BASED ON MASSIVE MIMO TECHNOLOGY

(71) Applicant: SHANGHAI RESEARCH CENTER FOR WIRELESS COMMUNICATIONS, Shanghai (CN)

(72) Inventors: Huiyue Yi, Shanghai (CN); Jiang Wang, Shanghai (CN); Jing Xu, Shanghai (CN); Yang Yang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 28 days.

(21) Appl. No.: 15/387,684

(22) Filed: Dec. 22, 2016

(65) Prior Publication Data

US 2018/0035460 A1 Feb. 1, 2018

(30) Foreign Application Priority Data

Aug. 1, 2016 (CN) .......................... 2016 1 0624544

(51) Int. Cl.
| | |
|---|---|
| *H04B 7/06* | (2006.01) |
| *H04W 4/70* | (2018.01) |
| *H04W 72/04* | (2009.01) |
| *H04W 74/08* | (2009.01) |
| *H04W 76/10* | (2018.01) |
| *H04B 17/318* | (2015.01) |

(Continued)

(52) U.S. Cl.
CPC .......... *H04W 74/085* (2013.01); *H04B 7/043* (2013.01); *H04B 7/0452* (2013.01); *H04B 7/061* (2013.01); *H04B 17/318* (2015.01); *H04W 4/70* (2018.02); *H04W 72/046* (2013.01); *H04W 74/0833* (2013.01); *H04W 76/10* (2018.02)

(58) Field of Classification Search
CPC .... H04B 17/318; H04B 7/043; H04B 7/0452; H04B 7/061; H04W 4/70; H04W 72/046; H04W 74/0833; H04W 74/085; H04W 76/10
See application file for complete search history.

(56) References Cited

U.S. PATENT DOCUMENTS

| | | |
|---|---|---|
| 2004/0082356 A1 | 4/2004 | Walton |
| 2006/0164969 A1* | 7/2006 | Malik ................. H04B 7/0408 370/203 |

(Continued)

*Primary Examiner* — Kashif Siddiqui
(74) *Attorney, Agent, or Firm* — Soroker Agmon Nordman

(57) ABSTRACT

An Internet of things (IoT) device random access method based on a massive MIMO technology is disclosed, and a cellular IoT communication system using the random access method is also disclosed. In the method, multiples users access a base station by using the same preamble sequence, the users accessing the base station in different beams respectively. By use of narrow beam characteristics of a massive MIMO technology, users in different beams can use the same preamble sequence for random access, thus greatly reducing collision probability of the random access and greatly increasing the number of users of random access, and congestion and collision problems during random access of a great number of users in the cellular IoT communication system can be effectively solved.

8 Claims, 5 Drawing Sheets

(51) Int. Cl.
*H04B 7/0426* (2017.01)
*H04B 7/0452* (2017.01)

(56) References Cited

U.S. PATENT DOCUMENTS

| | | | |
|---|---|---|---|
| 2008/0043771 A1* | 2/2008 | Cho | H04W 74/002 370/431 |
| 2010/0238846 A1* | 9/2010 | Xu | H04B 7/068 370/280 |
| 2011/0199905 A1* | 8/2011 | Pinheiro | H04W 28/0215 370/235 |
| 2011/0299492 A1* | 12/2011 | Lee | H04W 4/00 370/329 |
| 2012/0320874 A1* | 12/2012 | Li | H04W 48/12 370/331 |
| 2014/0120926 A1 | 5/2014 | Shin et al. | |
| 2014/0376652 A1* | 12/2014 | Sayana | H04B 7/0639 375/267 |
| 2015/0173004 A1* | 6/2015 | Nigam | H04W 48/16 370/331 |
| 2016/0157267 A1 | 6/2016 | Frenne et al. | |

* cited by examiner

| Preamble number+ beam number M | Sequence number of Beam 1 ($U_1$) | Random access response information $U_1S_1$ in Beam 1 | Sequence number of Beam 2 ($U_2$) | Random access response information $U_2S_2$ in Beam 2 | ...... |

| Sequence number of the preamble $p_i$ | (the number of beams M, each beam number) | $\sum_{m=1}^{M} PN_m \cdot U_m S_m$ |

# INTERNET OF THINGS DEVICE RANDOM ACCESS METHOD AND SYSTEM BASED ON MASSIVE MIMO TECHNOLOGY

BACKGROUND

Technical Field

The present invention relates to a random access method, particularly to an Internet of things (IoT) device random access method based on a massive MIMO (multiple-input-multiple-output) technology, and also to a cellular IoT communication system using the random access method, which belong to the field of wireless communication technologies.

Related Art

An IoT device refer to a communication terminal device "capable of monitoring surrounding environments, reporting its own state, accepting a command or task, and even taking an action according to the accepted information". It is widely expected that the IoT device will rapidly become the most widely used communication terminal devices, and in 2018, it will be about equal to the sum total of the number of smart phones, smart TVs, tablet computers, wearable devices and personal computers.

Currently, the 3GPP standardization organization proposes applying a 5G network technology to the IoT, and implementing interconnection of all the IoT devices via a 5G network. FIG. 1 shows a communication scenario between a Machine Type Communication (MTC) device and an MTC server. MTC users may operate a greater number of MTC devices through an MTC server. The MTC server is provided by an operator, and provides the MTC users with an application interface (API) accessing the MTC server. The MTC server and LTE network infrastructure may be located in the same domain. By connecting to a base station employing an LTE-A standard, the MTC users can control the MTC devices through the MTC server.

It can be expected that, in a 5G communication system (i.e., cellular IoT communication system) accommodating multiple IoT devices, a greater number of terminal devices (including, but not limited to, UE devices, IoT devices, etc.) will need to access a network wirelessly. Studies of the 3GPP standardization organization show that, when there are a great number of MTC devices, the MTC device and the UE devices will suffer from continuous collision on a random access channel (RACH). Specific description is provided as follows:

As shown in FIG. 2, in a physical random access channel (PRACH) of an LTE system, a random access process mainly includes the following four steps:

Step 1: Preamble sequence sending

The UE devices randomly select a preamble sequence from a predefined set. The preamble sequence is a robust entity, to enable a base station (BS) to obtain synchronization. The preamble sequence does not include specified reserved information or data, and thus can be used as a pilot sequence. Since multiple user devices select a pilot sequence without coordination, thus, if two or more user devices select the same pilot sequence, a conflict may occur. However, in this stage, the base station only detects whether a specified preamble sequence is used.

Step 2: Random access response

The base station sends a random access response corresponding to respective activated preamble sequences, and conveys physical layer parameters (e.g., time advance (TA)) and allocates resources to the UE devices activating the preamble sequences.

Step 3: Connection setup request information

The UE devices receiving responses to preamble sequences sent to them will send RRC (radio resource control) connection request information, to acquire resources for subsequent data sending. If more than one UE device activates the same preamble sequence, all the UE devices using the same resources will send their RRC connection requests, and the conflict will be detected by the base station.

Step 4: Connection setup response information/collision solution

If the base station successfully receives and detects connection setup request information sent by the UE devices in step 3, the base station sends connection setup response information to the UE devices. If the UE devices receive the connection setup response information, the random access process is accomplished.

If, in step 1, two or more UE devices select the same preamble sequence (i.e., collision occurs), the user devices will send connection setup request information through the same uplink resource block in step 3. In this case, the base station cannot demodulate information, and the random access process fails due to collision. The user devices will restart the random access process from step 1. The step is referred to as conflict solution, and further includes one or more steps aimed to solve conflicts. Conflict solution is a complicated step (it is possible to access a network often by performing the random access process multiple times), leading to great time delay. Moreover, power consumption of the terminal devices may also increase sharply, causing the life cycle of the IoT device to be shortened greatly. Such a defect is fatal for low-power-consumption IoT environments.

SUMMARY

With respect to the shortcomings of the prior art, a primary technical problem to be solved in the present invention is to provide an IoT device random access method based on a massive MIMO technology.

Another technical problem to be solved in the present invention is to provide a cellular IoT communication system using the random access method.

To achieve the foregoing invention objectives, the present invention adopts the following technical solutions:

According to a first aspect of embodiments of the present invention, an IoT device random access method based on a massive MIMO technology is provided, used in a cellular IoT communication system including multiple user devices and at least one base station, the base station providing multiple beams; the method including:

the multiple user accessing the base station by using the same preamble sequence random selected by each user device of the multiple user devices, the user devices accessing the base station in different beams respectively.

Preferably, the base station forms random access response information in the beams, beam-forms the random access response information by using eigen-spaces of the beams, and sends the random access response information to the user devices.

Preferably, the base station sends indices of the beams and the random access response information in the beams together to the user devices.

Preferably, the base station performs a spreading operation on the random access response information by using pseudo random sequences, and then sends the random access response information to the user devices.

Preferably, one-to-one correspondence exists between the pseudo random sequences and the beams.

Preferably, the base station adds the random access response information in the beams, and sends the random access response information to the user devices.

Preferably, the user devices send random access request information to the base station, the random access request information including indices of the beams and signal intensity in the beams.

Preferably, the base station, according to the signal intensity in the beams, determines beams which have the signal intensities, and sends RRC connection setup information on the determined one or more beams.

According to a second aspect of the embodiments of the present invention, a user device and a base station implement random access of IoT devices by using the IoT device random access method are provided.

Compared with the prior art, the present invention makes full use of narrow beam characteristics of a massive MIMO technology, to enable user devices in different beams to use the same preamble sequence for random access (theoretically, if the base station has N beams, the number of user devices of random access can be increased N times than that in the existing method), which thus greatly reduces collision probability of the random access, greatly increases the number of user devices of random access, and effectively solves congestion and collision problems during random access of a great number of user devices in the cellular IoT communication system.

DETAILED DESCRIPTION

The technical contents of the present invention are further described below in detail with reference to the accompanying drawings and specific embodiments.

At first, it should be noted that various kinds of sequence numbers used hereinafter, for example, $M_b$, M, N, J, K and the like, are all positive integers. To make the writing of the specification concise, they are not described one by one hereinafter.

A massive MIMO technology, due to having characteristics of high data transmission rate, high spectrum effectiveness, high energy efficiency and so on, has become a key technology employed by a 5G communication system, and also becomes one of key technologies solving a great number of user devices connections in a cellular IoT communication system.

On the basis of the existing massive MIMO technology, the cellular IoT communication system for implementing the IoT device random access method provided in the present invention includes at least one base station based on a massive MIMO technology and multiple user devices (i.e. mobile terminals). The base station has $M_b$ beams ($U_1$, $U_2$, . . . , $U_{M_b}$), and the user devices use omnidirectional antennas. Suppose that, in the random access process, there are N preamble sequences $\{p_i\}_{i=1}^N$ or the user devices to perform random access. Moreover, suppose that there are $M_b$ pseudo random sequences $PN_j$ (j=1, 2, . . . , $M_b$) which are individually corresponding to the $M_b$ beams.

Figure 1:
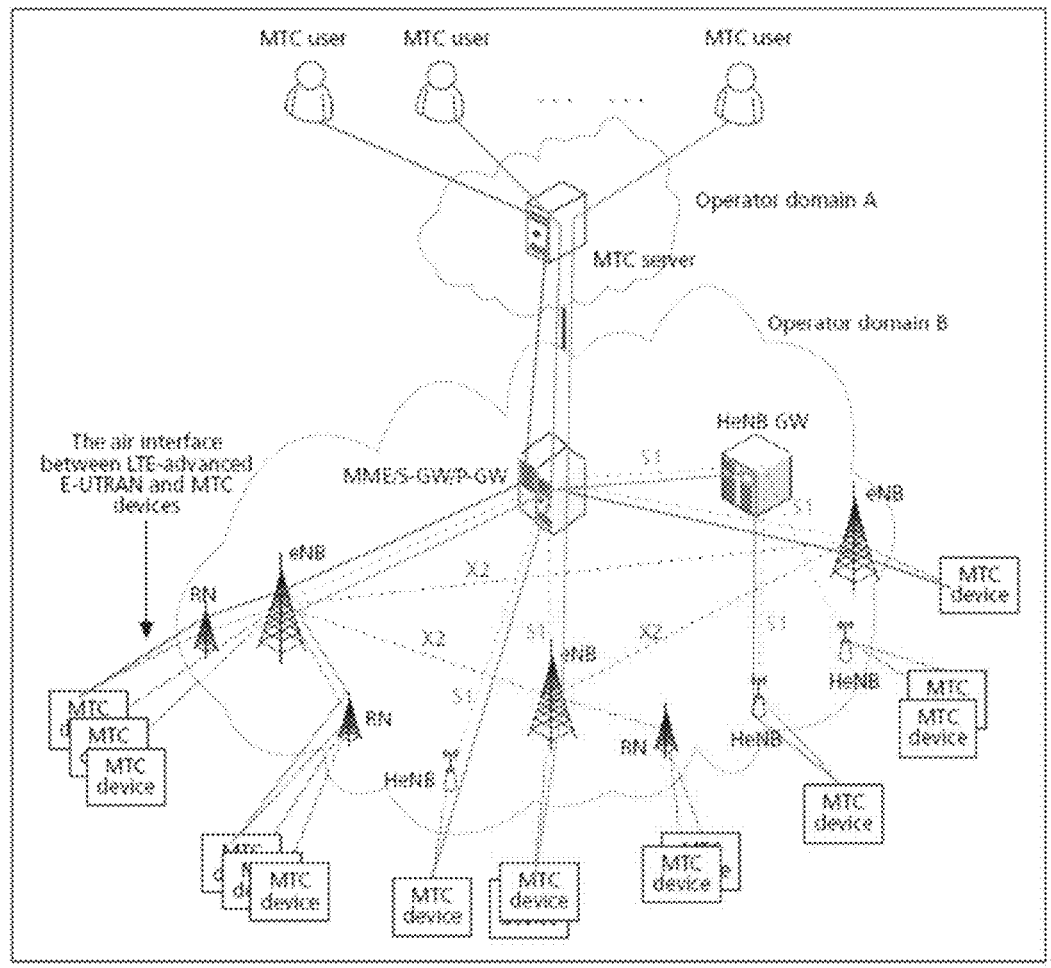
FIG. 1 is a schematic diagram of a communication scenario between an MTC device and an MTC server.
Figure 2:
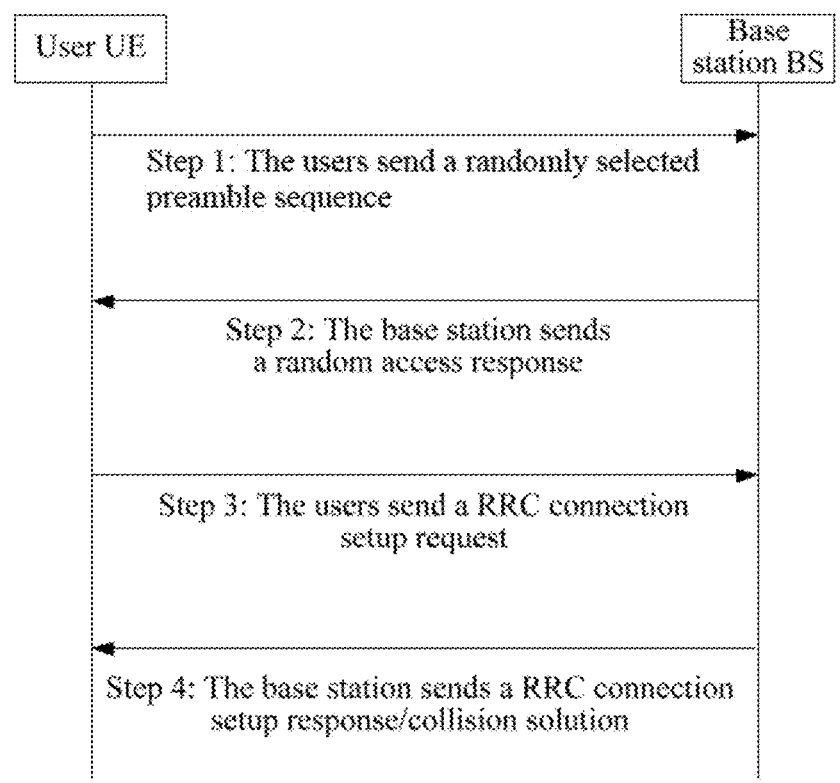
FIG. 2 is a flowchart of a random access process in a physical random access channel protocol of an LTE system.
Figure 3:
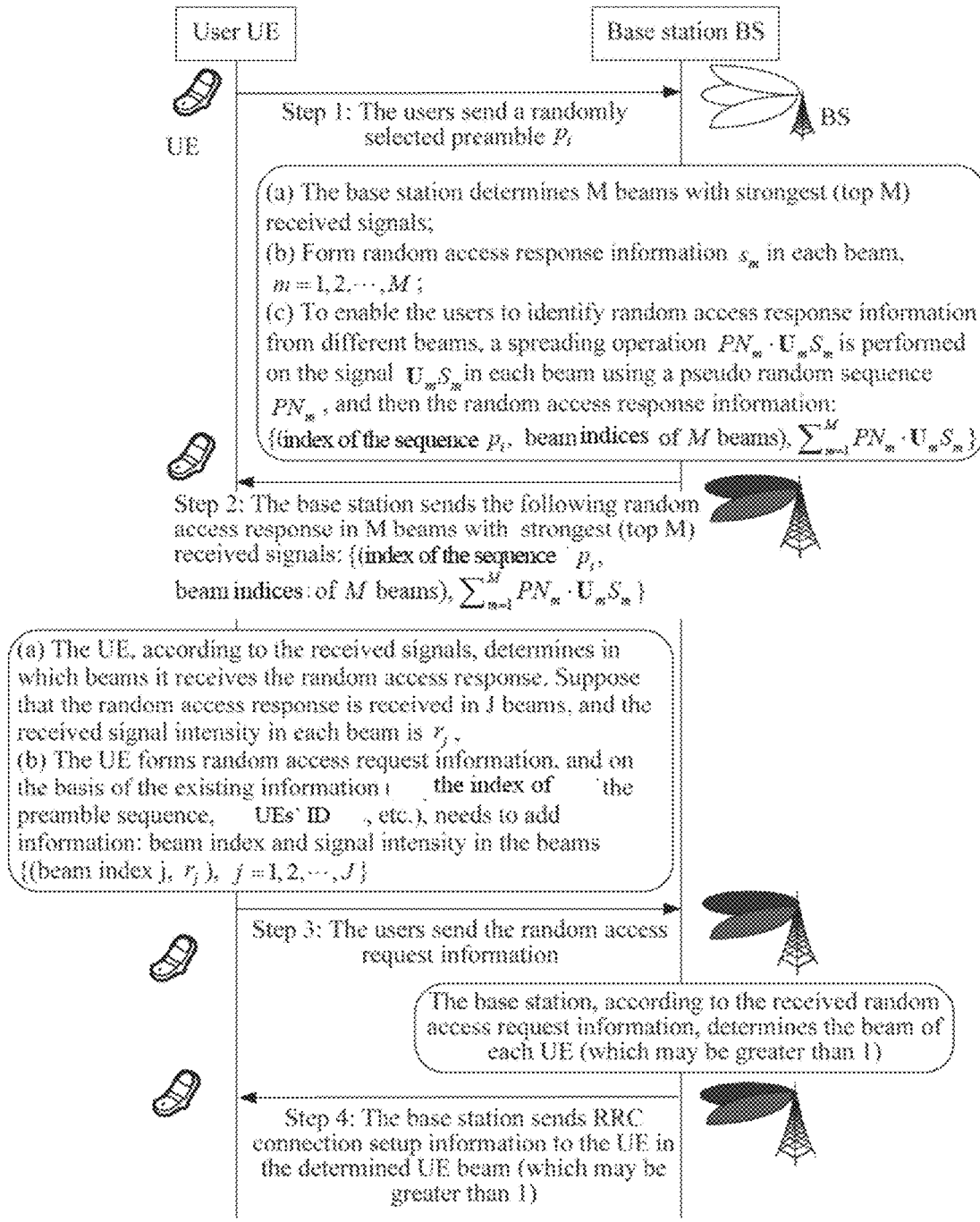
FIG. 3 is a flowchart of an IoT device random access method based on a massive MIMO technology according to the present invention.

On the basis of the cellular IoT communication system, with respect to random access demands of a greater number of user devices, the present invention proposes a multi-beam precoding and spreading IoT device random access method, which mainly includes the following four steps. Detailed and specific description is provided below in combination with FIG. 3.

Step 1: User devices randomly select a preamble sequence $p_i$ for random access.

The user devices randomly select a preamble sequence $p_i$ from a predefined preamble sequence set $\{p_i\}_{i=1}^N$. The preamble sequence set $\{p_i\}_{i=1}^N$ includes N preamble sequences for the user devices to perform random access. The preamble sequence has excellent self-correlation characteristics, enabling the base station to obtain uplink synchronization.

Since multiple user devices select preamble sequence without coordination, two or more user devices may select the same preamble sequence. However, in this stage, the base station only detects whether a certain preamble sequence is used.

Step 2: The base station sends random access response information in beams with higher signal intensity.

The base station detects the preamble sequence $p_i$ in the beams and determines M beams with relatively stronger receiving signals, and forms random access response information $S_m$ in each beam $U_m$, m=0, 1, 2 . . . M (only user devices in beams $U_m$ can receive the random access response information $S_m$). The base station performs a spreading operation $PN_m \cdot U_m S_m$ on each signal $S_m$ in the beams $U_m$ by a pseudo random sequence $PN_m$, such that the user devices can identify which beam the random access response information $S_m$ comes from. In this way, the base station forms final random access response information {(index of preamble sequence $p_i$, indexes of M beams), $\Sigma_{m=1}^M PN_m \cdot U_m S_m$}, and sends the signal. Details are provided as follows:

Firstly, the base station detects a preamble sequence $p_i$ in $M_b$ beams ($U_1$, $U_2$, . . . , $U_{M_b}$). Then, the base station judges whether the received signal intensity of the preamble sequence $p_i$ received in the beams $U_1$, $U_2$, . . . , $U_{M_b}$ reaches a threshold $\gamma_{th}$.

If the received signal intensity of the preamble sequence $p_i$ is greater than the threshold, random access response information $S_m$ is formed in the beam; and if it is less than the threshold, the preamble sequence in the next beam is detected.

Herein, suppose that the received signal intensity of the preamble sequence in M beams of the $M_b$ beams exceeds the threshold. The base station forms random access response information $S_m$ in each beam m of the M beams, and beam-forms the random access response information $S_m$ by a eigen-space $U_m$ of the beam, to obtain $U_m S_m$. Therefore, only user devices in the beam $U_m$ can receive beam-formed random access response information $U_m S_m$, and user devices in other beams cannot receive the beam-formed random access response information.

Figures 4, 5, 6:
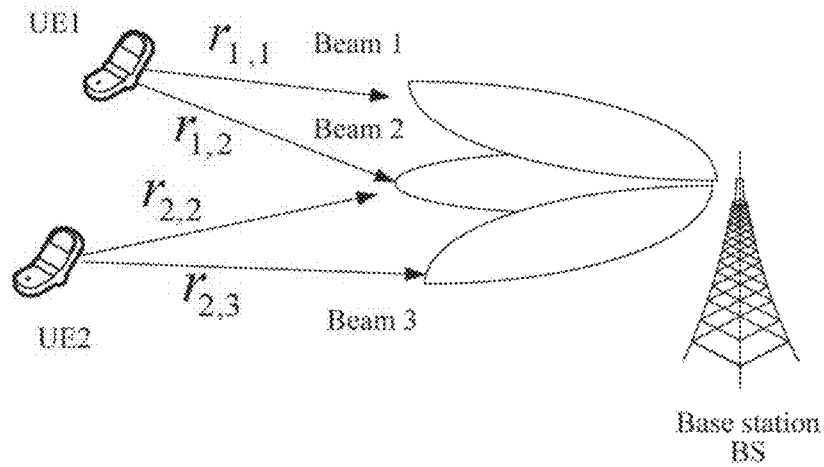
FIG. 4 is a first schematic format diagram of random access response information in the present invention.
FIG. 5 is a second schematic format diagram of random access response information in the present invention.
FIG. 6 is a schematic diagram of optimal beam selection in the case of two user devices and three beams in the present invention.

An option for the format of the beam-formed random access response information $U_m S_m$ is as shown in FIG. 4. The user devices can judge, according to the received random access response information, from which beam the random access response information comes. However, the basic format of the random access response information shown in FIG. 4 may significantly increase resource overhead.

In order to reduce the resource overhead, another option is provided in the present invention: to enable the user devices (UE, IoT devices, etc.) to identify from which beam the random access response information $S_m$ comes, the base station performs a spreading operation $PA_m \cdot U_m S_m$ on the beam-formed random access response information $U_m S_m$ in the beam m using a pseudo random sequence $PN_m$ (one-to-one correspondence between each beam and the pseudo random sequence is predefined in the base station as well as the user devices, and thus the base station need not notify the user devices about a sequence number of the pseudo random sequences). Then, the base station adds up the random access response information after spreading operation in the M beams and then obtains $\Sigma_{m=1}^{M} PN_m \cdot U_m S_m\}$. Finally, the base station sends the random access response information after spreading operation in the format shown in FIG. 5.

With the format shown in FIG. 5, the random access response information will be transmitted in different beams through a beam-forming technology, and only user devices in that beam can receive the random access response information. On the other hand, the random access response information in a particular beam is first spread and then sent out, and thus the user devices can determine from which beam the random access response information comes.

It is thus clear that a predetermined correspondence is established between the sequence numbers of the pseudo random sequence and the sequence numbers of the beams, and the base station and the user devices all know the correspondence. In this way, if the user devices receive the random access response information from one pseudo random sequence, they can know from which beam the pseudo random sequence comes. Thus, the use of the solution can greatly reduce the resource overhead.

Step 3: Firstly, the user devices determine in which beams the base station sends a random access response according to the received random access response information. According to index of the pseudo random sequence in the received random access response information, the user devices can know that the base station sends the random access response information in M beams.

Then, the user devices perform a dispreading operation respectively on the received random access response information in the M beams. Suppose that the user devices receive the random access response information in J beams, and the received signal intensity in each beam is $r_j$.

Afterwards, the user devices select J beams with relatively stronger (top J) received signal intensity, and forms random access request information. The random access request information includes {the index of the preamble sequence $p_i$, IDs of the UEs, [indices of the beams and signal intensity in the beams (beam sequence number j, $r_j$): j=1, . . . , J]}. The newly-added "indices of the beams and signal intensity in the beams (beam sequence number j, $r_j$)" on the basis of the existing massive MIMO technology is used to judge in which beams the user devices are located and corresponding signal intensities in the beams. In this way, the base station could determine optimal beams of the user devices and can solve the conflict problem.

Finally, the user devices send the random access request information.

It should be noted that, with the information format and the corresponding information generation and sending manner in step 2 and step 3, the user devices in different beams can use the same preamble sequence for random access. This greatly reduces collision probability of the random access, reduces time delay in the random access, and greatly increases the number of user devices for random access, particularly suitable for random access of a greater number of user devices in the cellular IoT communication system.

Step 4: The base station, according to the received random access request information, determines in which beam each user device sends the random access request information. Moreover, the base station acquired the optimal beam of each user device according to signal intensity on each beam for each user device in the random access request information. Finally, the base station sends RRC connection setup information to the user devices within the optimal beam of the user devices. Details are provided hereafter.

Firstly, the base station, according to the received random access request information, determines in which beam each user device sends the random access request information. Moreover, the base station acquired the optimal beam of each user device according to signal intensity on each beam for each user device in the random access request information. How the base station selects the optimal beam of each user device and how the conflict problem is solved are described below with an example. As shown in FIG. 6, suppose that the base station has three beams and two user devices select the same preamble sequence for random access. A random access request from UE1 reaches the base station through Beam 1 and Beam 2, and a random access request from UE2 reaches the base station through Beam 2 and Beam 3. In addition, suppose that signal intensities meet requirements: $r_{1,1} > r_{1,2}$, $r_{2,2} > r_{2,3}$, and the signal intensity $r_{1,2}$ substantially equal to $r_{2,2}$, wherein $r_{1,1}$ is the signal intensity of the Beam 1 from UE1, $r_{1,2}$ is the signal intensity of the Beam 2 from UE1, $r_{2,2}$ is the signal intensity of the Beam 2 from UE2, $r_{2,3}$ is the signal intensity of the Beam 3 from UE2.

As UE1 and UE2 have almost the same signal intensity in Beam 2, the base station cannot successfully detect the signal of UE1 or UE2 in Beam 2. However, the base station, through the signal from UE1 detected in Beam 1, finds that the signals from UE1 reach the base station through Beam 1 and Beam 2 and acquires the signal intensities in the two beams ($r_{1,1}$ and $r_{1,2}$). Likewise, the base station, through the signal from UE2 detected in Beam 3, finds that the signals from UE1 reach the base station through Beam 2 and Beam 3 and acquired the signal intensities in the two beams ($r_{2,2}$ and $r_{2,2}$). Finally, the base station can determine that Beam 1 is the optimal beam of UE1, and Beam 2 is the optimal beam of UE2. Thus, the base station not only selects the optimal beams of the user deices, but also solves the conflict problem in Beam 2.

Then, the base station sends RRC connection setup information to the user devices in the optimal beams of the user devices.

The above describes the IoT device random access method based on a massive MIMO technology provided in the present invention in detail. In the following, the advantages of the present invention over the existing random access method are described by comparing collision probability. Suppose that the number of preamble sequences is N=40, the number of beams of the base station is $M_b$ ($M_b$=1 corresponds to the conventional solution), and there are K user devices for random access). In this case, the probability that no conflict occurs may be expressed as:

$$p_d = \frac{(NM_b) \cdot (NM_b - 1) \cdot (NM_b - K + 1)}{(NM_b)^K} \quad (1)$$

Therefore, the collision probability may be expressed as:

$$p_c = 1 - p_d \quad (2)$$

Figure 7:
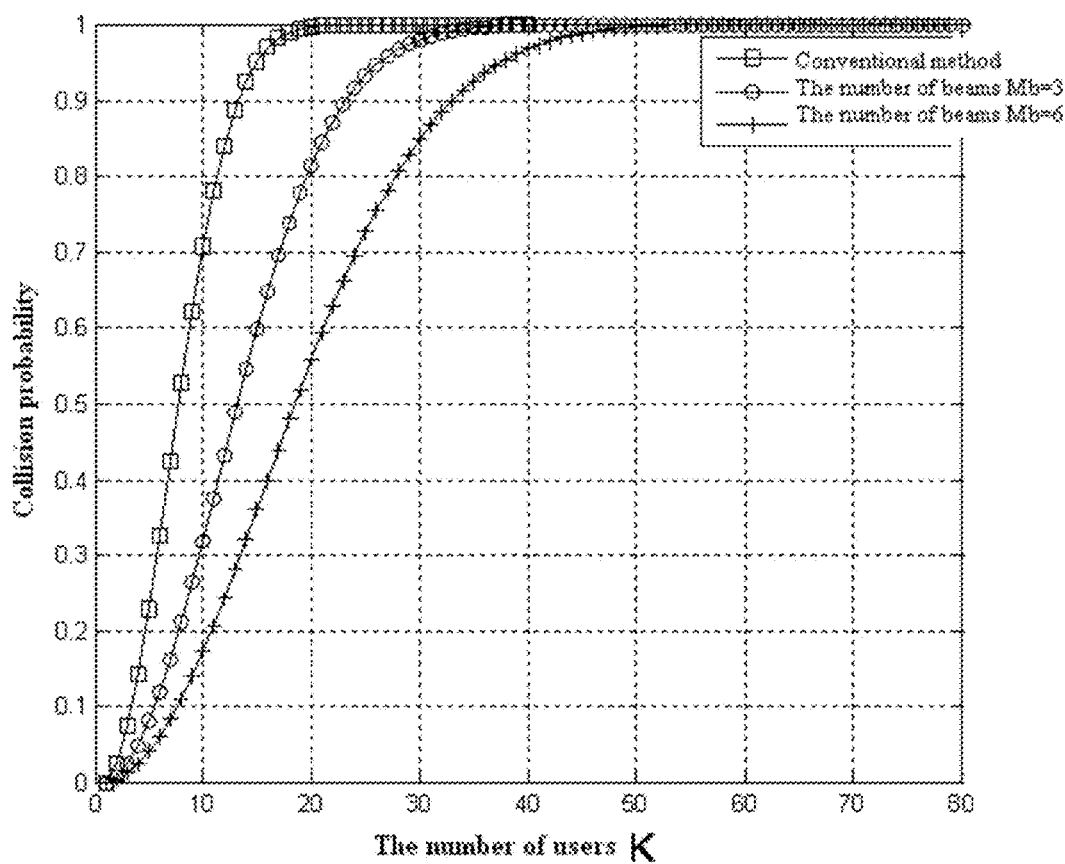
FIG. 7 is a schematic diagram of collision probability in the case of different user device numbers K and different beam numbers $M_b$ in the present invention.

FIG. 7 shows the collision probabilities in the case of different user device numbers K and different beam numbers $M_b$. In FIG. 7, $M_b$=1 corresponds to the conventional solution. It can be seen from FIG. 7 that the collision probability of the random access in the present invention is evidently lower than the collision probability of the existing random access method.

Actually, when the collision probability of the method of the present invention is calculated by using the formula (2), only the situation where each user device only selects one beam is took into account. In fact, for the same preamble sequence, collision may not occur as long as two user devices use the preamble sequence in different beams and in at least two beams. Therefore, the collision probability of random access of the IoT device calculated by using the formula (2) is a conservative value, and the real collision probability will be much lower than it. It can be seen from FIG. 7 that the present invention utilizes narrow beam characteristics of a massive MIMO technology, to enable user devices in different beams to use the same preamble sequence for random access (theoretically, if the base station has N beams, the number of user devices for random access can be increased N times than that in the existing method). Thus, the present invention greatly reduces collision probability of the random access, greatly increases the number of user devices for random access, and effectively solves congestion and collision problems during random access of a great number of user devices in the cellular IoT communication system.

It can be seen from FIG. 7 that the present invention utilizes narrow beam characteristics of a massive MIMO technology, to enable users in different beams to use the same preamble sequence for random access (theoretically, if the base station has N beams, the number of users for random access can be increased N times than that in the existing method). Thus, the present invention greatly reduces collision probability of the random access, greatly increases the number of users for random access, and effectively solves congestion and collision problems during random access of a great number of users in the cellular IoT communication system.

The above describes the IoT device random access method based on a massive MIMO technology and the system thereof provided in the present invention in detail. Any obvious variation made by those of ordinary skill in the art without departing from the essence and the spirit of the present invention will infringe upon the patent right of the present invention, and may bear the corresponding legal responsibility.

What is claimed is:

1. A user device for applying in a cellular IoT communication system, the system comprising multiple user devices and at least one base station, the base station provides multiple beams, wherein
   at least two of the multiple user devices access the base station by using the same preamble sequence, respectively in at least two of the multiple beams, each of the multiple user devices sends random access request information comprising indices of the beams and signal intensities in the beams to the base station for access.

2. A base station for applying in a cellular IoT communication system, the system comprising multiple user devices and at least one base station, the base station provides multiple beams, wherein
   the base station forms random access response information in the multiple beams, beam-forms the random access response information by using an eigen-space of the multiple beams,
   the base station performs a spreading operation on the random access response information by using pseudo random sequences,
   the base station adds up the random access response information after the spreading operation, to form the random access response information sending to the multiple user devices.

3. The base station for applying in a cellular IoT communication system according to claim 2, wherein
   the base station detects a preamble sequence in each of the multiple beams from the multiple user devices, the preamble sequence from the multiple user devices being the same.

4. The base station for applying in a cellular IoT communication system according to claim 3, wherein
   the base station sends indices of the beams and the random access response information in the beams to the multiple user devices.

5. The base station for applying in a cellular IoT communication system according to claim 2, wherein
   one-to-one correspondence exists between the pseudo random sequences and the beams.

6. The base station for applying in a cellular IoT communication system according to claim 5, wherein
   the multiple user devices send random access request information to the base station, the random access request information comprising indices of the beams and signal intensities in the beams.

7. The base station for applying in a cellular IoT communication system according to claim 6, wherein
   the base station, according to the signal intensities in the beams, determines beams which have the signal intensities greater than a preset threshold, and sends RRC connection setup information on the beams determined.

8. The base station for applying in a cellular IoT communication system according to claim 2, wherein
   the base station performs a spreading operation on each random access response information in the beams, such that the multiple user devices can identify which beam the random access response information comes from.

* * * * *